United States Patent
Kane (10) Patent No.: US 9,336,259 B1
(45) Date of Patent: May 10, 2016

(54) METHOD AND APPARATUS FOR HISTORICAL ANALYSIS ANALYTICS

(71) Applicant: CA, Inc., Islandia, NY (US)

(72) Inventor: John P. Kane, Tafton, PA (US)

(73) Assignee: CA, Inc., New York, NY (US)

(*) Notice: Subject to any disclaimer, the term of this patent is extended or adjusted under 35 U.S.C. 154(b) by 173 days.

(21) Appl. No.: 13/962,497

(22) Filed: Aug. 8, 2013

(51) Int. Cl.
*G06F 17/30* (2006.01)
*G06F 11/07* (2006.01)
*G06F 11/14* (2006.01)

(52) U.S. Cl.
CPC .... *G06F 17/30371* (2013.01); *G06F 17/30592* (2013.01); *G06F 11/0793* (2013.01); *G06F 11/1471* (2013.01); *G06F 17/30566* (2013.01)

(58) Field of Classification Search
CPC . G06F 11/0793; G06F 11/08; G06F 11/1471; G06F 11/14; G06F 17/30592; G06F 17/30566
USPC ............... 707/770, 802, 803, 673, 679, 691; 714/57, 48, 37; 706/15, 46, 48, 24; 705/22
See application file for complete search history.

(56) References Cited

U.S. PATENT DOCUMENTS

| | | | |
|---|---|---|---|
| 5,463,768 A * | 10/1995 | Cuddihy et al. | 714/37 |
| 7,290,275 B2 * | 10/2007 | Baudoin | G06Q 40/08 726/1 |
| 8,170,971 B1 * | 5/2012 | Wilson et al. | 706/46 |
| 8,271,336 B2 * | 9/2012 | Mikurak | 705/22 |
| 8,732,101 B1 * | 5/2014 | Wilson et al. | 706/15 |
| 8,751,432 B2 * | 6/2014 | Berg-Sonne et al. | 706/48 |
| 2008/0016564 A1 * | 1/2008 | Claudatos | G06F 21/554 726/22 |
| 2008/0047013 A1 * | 2/2008 | Claudatos et al. | 726/24 |
| 2008/0177770 A1 * | 7/2008 | Friedlander et al. | 707/101 |
| 2010/0205486 A1 * | 8/2010 | Chiu et al. | 714/48 |
| 2011/0004622 A1 * | 1/2011 | Marson | 707/770 |
| 2014/0281757 A1 * | 9/2014 | Lukas et al. | 714/57 |

* cited by examiner

*Primary Examiner* — Frantz Coby
(74) *Attorney, Agent, or Firm* — Coats & Bennett, PLLC (57) ABSTRACT

A computer-implemented method is disclosed in which multiple disparate data sources having a different schemas are gathered, and relationships between the data sources are determined. A blended data set is created from the multiple data sources based on the determined relationships. A current behavior of a computing system is determined, with the current behavior being indicative of an anomaly. From the blended data set, historical behaviors of the same computing system or a similar computing system are determined. The current behavior is correlated to the historical behaviors to obtain a correlation, and a response to the anomaly is determined based on the correlation. A complementary computing device and computer program product are also disclosed.

14 Claims, 6 Drawing Sheets

METHOD AND APPARATUS FOR HISTORICAL ANALYSIS ANALYTICS

TECHNICAL FIELD

The present disclosure relates to historical analysis analytics, and more particularly to performing analytics for a computing system based on historical behaviors of the computing system determined from one or more blended data sets incorporating data from a plurality of disparate data sources.

BACKGROUND

As computing systems grow in complexity, it becomes increasingly likely that the people who design and/or build a given computing system are not the same people who are ultimately responsible for the operation and maintenance of the computing system. In this regard, "computing system" broadly refers to one or more computing devices configured to perform a plurality of computer-implemented transactions (e.g., an e-commerce web server running point of sale transactions). A result of this growing divide between design and maintenance is that when problems arise with the computing system, solutions that may be readily apparent to the system creators are otherwise not as apparent to those maintaining the computing system.

Commercially available analytics products have the ability to predict that something is going to happen (e.g., a server crash) based upon prior performance and events that have occurred in the past. For example, a manufacturer of a product may decide that 3 errors in 1,000,000 is acceptable, that at 300/1,000,000 you may want to keep an eye on things, and that at 3,000/1,000,000 one can predict that a computing system is about to experience a hard failure and associated server crash, based on what has occurred in the past.

While some analytics products are able to make some meaningful predictions along these lines, more complex problems, or problems whose solution is not as immediately apparent are problematic. For such problems, the causal relationship between a problem and unpredicted symptoms of that problem can be difficult to ascertain. That is, a detected problem in a given computing system may only be a tangential symptom of an otherwise undetected root cause, and without the expert input of the system creators, identifying the root cause can be quite challenging and time-consuming.

SUMMARY

According to one aspect of the present disclosure, a computer-implemented method comprises gathering multiple disparate data sources having a different schemas, determining relationships between the data sources, and creating a blended data set from the multiple data sources based on the determined relationships. A current behavior of a computing system is determined, with the current behavior being indicative of an anomaly. Historical behaviors of the same computing system or a similar computing system are determined from the blended data set. The current behavior is correlated to the historical behaviors to obtain a correlation, and a response to the anomaly is determined based on the correlation.

According to another aspect of the present disclosure, a computing device comprises an interface circuit and a controller. The interface circuit is configured to receive data from a plurality of gatherers, with each gatherer being in communication with one or more of a plurality of data sources that are disparate and have different schemas. The controller is configured to gather the data received from the plurality of data sources, determine relationships between the data sources, and create a blended data set from the multiple data sources based on the determined relationships. The controller is further configured to determine a current behavior of a computing system, with the current behavior being indicative of an anomaly. The controller is further configured to determine, from the blended data set, historical behaviors of the same computing system or a similar computing system. The controller is further configured to correlate the current behavior to the historical behaviors to obtain a correlation, and to determine a response to the anomaly based on the correlation.

According to another aspect of the present disclosure, a computer program product comprises a computer readable storage medium having computer readable program code embodied therewith. The computer readable program code comprises computer readable program code configured to gather multiple disparate data sources having a different schemas, computer readable program code configured to determine relationships between the data sources, and computer readable program code configured to create a blended data set from the multiple data sources based on the determined relationships. The computer readable program code further comprises computer readable program code configured to determine a current behavior of a computing system, with the current behavior being indicative of an anomaly. The computer readable program code further comprises computer readable program code configured to determine, from the blended data set, historical behaviors of the same computing system or a similar computing system. The computer readable program code further comprises computer readable program code configured to correlate the current behavior to the historical behaviors to obtain a correlation. The computer readable program code further comprises computer readable program code configured to determine a response to the anomaly based on the correlation.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes analysis of data from disparate data sources having different schemas, and comparison of that data with historical operational information to better detect and predict anomalous behavior, and recommend one or more potential responses to the anomalous behavior. In some embodiments, a confidence indicator is used to assign an estimated likelihood of success to each of the proposed responses. This facilitates making better decisions faster, and with an understanding of why particular anomalous behavior response is being recommended. This also provides an indication of a likelihood that a remedial measure will resolve a detected anomaly of an analyzed computing system.

Figure 1:
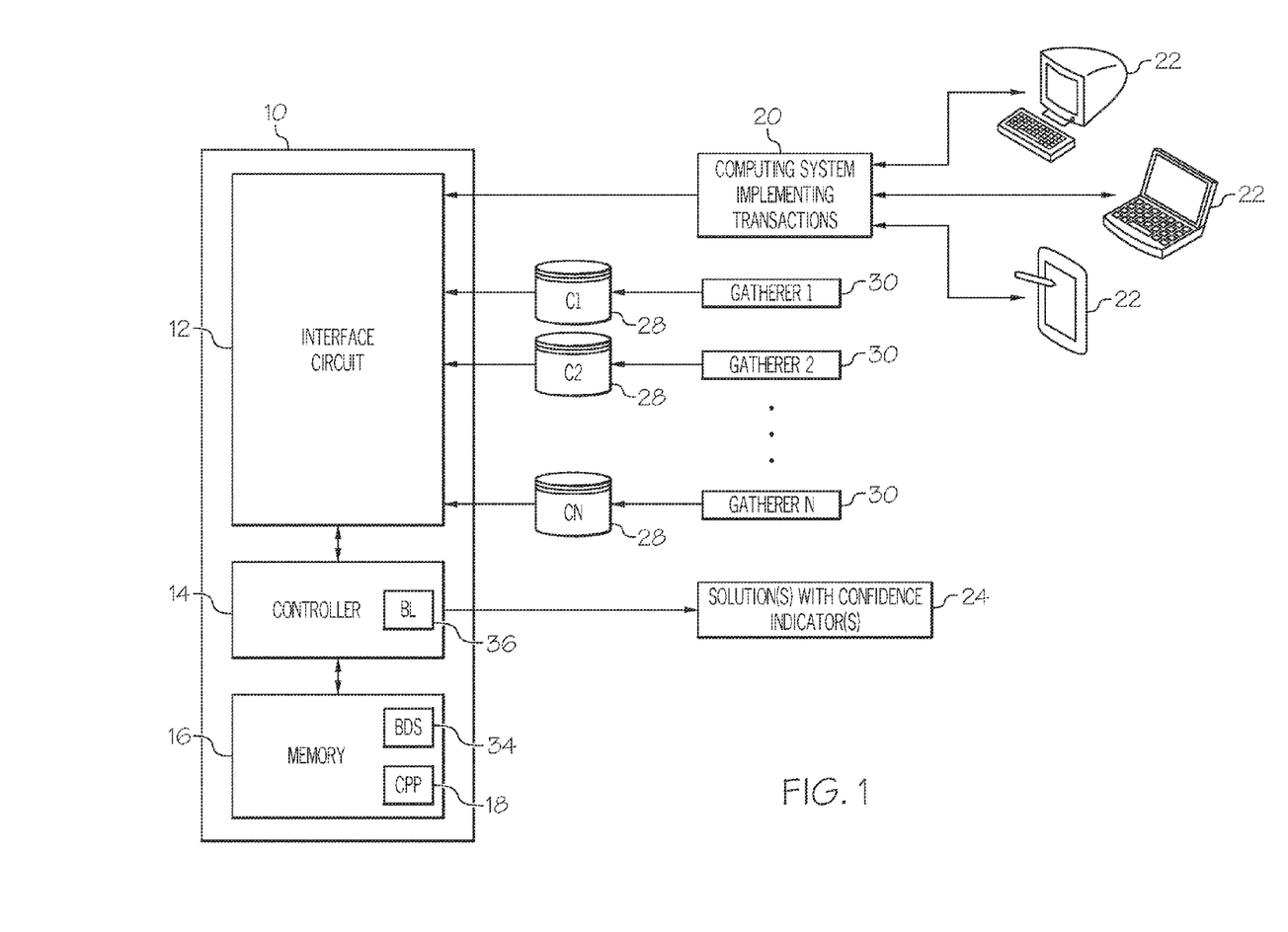
FIG. 1 is a block diagram of a computing device operative to analyze computing system behaviors.

With this in mind, FIG. 1 illustrates a computing device 10 operative to analyze the behavior of a computing system 20 which is configured to implement a plurality of transactions. These transactions may cause the computing system 20 to interact with a plurality of additional computing devices 22. For example, the computing system 20 may act as a web server for the computing devices 22, and/or may implement e-commerce functionality for a plurality of shoppers using the computing devices 22. The computing device 10 includes an interface circuit 12 configured to receive performance data from the computing system 20, such as system logs, hardware statistics, etc. The interface circuit 12 is also used to receive data 28 (hereinafter "collections") from a plurality of gatherers 30. Each gatherer 30 is in communication with one or more of a plurality of data sources 32 that are disparate and have different schemas (see, e.g., FIG. 3). The computing device 10 also includes a controller 14 that is configured to gather (through interface circuit 12) the collections 28 from the plurality of data sources, process that data for storage in memory 16, and determine one or more responses to detected anomalous behavior of analyzed computing system 20 based on the received data. If the anomalous behavior indicates a problem, the response comprises one or more solutions 24 to the problem (optionally with a confidence indicator). Otherwise if the anomalous behavior indicates something favorable, then the response may correspond to one or more steps to take to reproduce that favorable behavior in other computing systems (e.g., other computer systems implementing the same type of transactions as the computing system 20).

Figure 2:
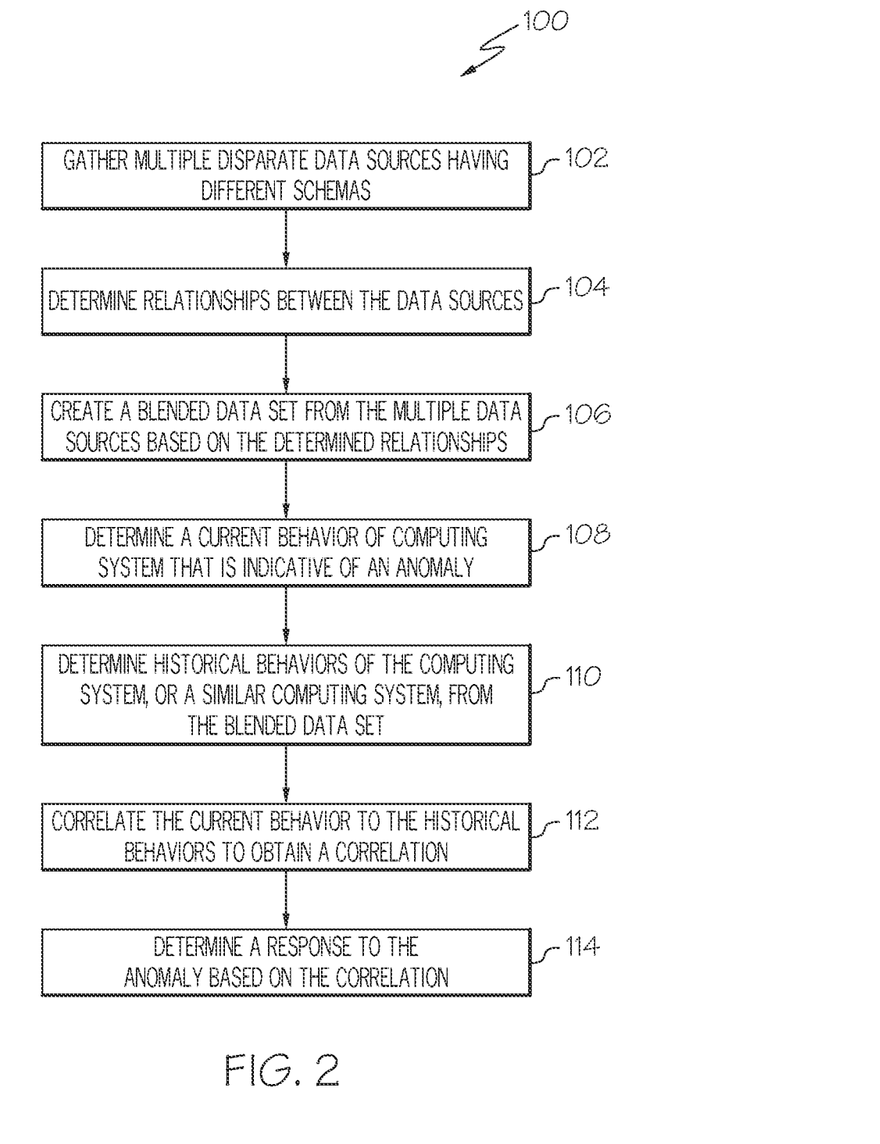
FIG. 2 schematically illustrates a method for analyzing computing system behaviors.

FIG. 2 schematically illustrates a method 100 for analyzing behavior of the computing system 20. In one or more embodiments, the method 100 is implemented by the controller 14 of computing device 10. According to the method, the computing device 10 gathers 102 multiple disparate data sources 32 having a different schemas, determines 104 relationships between the data sources 32, and creates 106 a blended data set 36 from the multiple data sources 32 based on the determined relationships. The computing device 10 determines 108 a current behavior of a computing system (e.g., computing system 20) which is configured to implement a plurality of transactions, with the current behavior being indicative of an anomaly. From the blended data set 36, the computing device 10 determines 110 historical behaviors of the same computing system 20 or a similar computing system. The computing device 10 correlates 112 the current behavior to the historical behaviors to obtain a correlation, and based on the correlation determines 114 a response to the anomaly (e.g., a solution 24 for a detected problem). Each of these actions will be discussed in greater detail below.

In one or more embodiments, the computing system 20 has a defined acceptable performance profile, and the current behavior indicative of an anomaly includes the computing system not conforming to that performance profile. For example, assume that computing system 20 includes one or more web servers providing an e-commerce platform for a company, with those web servers having a defined performance profile (e.g., expected quantity of traffic, acceptable quantity of abandoned carts, etc.). The current behavior indicative of a problem may include website traffic that is unusually high, or may include an abnormally high number of abandoned carts (i.e., customers who add items to their shopping cart but never checkout). If the traffic is unusually high, this may initially seem like a reason for concern, as it could indicate that a malicious user is attempting to hack into the system 20. By analyzing historical performance data, however, it may become apparent that the deviation from the performance profile is actually expected because this same time every year traffic gets really high (e.g., perhaps it is around the Christmas holidays). Such a conclusion could be determined based on the computing device 10 gathering not only server logs for the computing system 20, but also historical sales data, which otherwise would not be correlated with such traffic logs. In this example, the "blended data set" could include the historical sales data and the server logs, and the correlation would indicate a relationship between server traffic and cyclical annual sales peaks.

Alternatively, it may be determined that the deviation from the normal web traffic performance profile is expected because a sales promotion was just launched by a company using the computing system 20. Such a conclusion could be determined based on a gatherer 30 mining marketing data for the company, which also would otherwise not be correlated with web server traffic logs. In this example, the "blended data set" would include the sales promotion scheduling, and the server data. The correlation would indicate a predicted spike in web traffic, possibly due to past promotions having similar traffic. In either of these examples no remedial action is necessary because the deviation from the performance profile is permissible.

However it is also possible that the deviation is indicative of a larger problem. For example, if there is no sales promotion and it is not a typical high volume sales time of the year, but server usage is still unusually high. In one or more embodiments, to help identify the cause of this problem and a suitable solution, components of the computing system 20 are analyzed, and a determination is made as to whether a configuration of any of those components have been changed over an observation period during which the computing system 20 was configured to implement the transactions. This could include determining how many servers are included in the computing system 20, what types of servers they are, what hardware is included in each server, what software is included in each server, etc.

For example, assume that instead of having web traffic that is too high, it is determined that shoppers are abandoning their shopping carts at checkout on a website supported by the computing system 20. It may be determined that a piece of software on the computing system 20 was recently updated. Based on this an analysis could be performed to determine if the changes were intentional, and also of who made the changes. Further analysis may reveal that the individual or team who installed the software update has a track record of their work leading to server issues when they performed software updates in the past. Based on this, the provided solution 24 may include a recommendation to roll back the computing system 20 to an earlier state before the update was installed. The fact that the person (or team) who installed the problematic update has made similar mistakes in the past would increase the likelihood that this is the cause of the current problem, and so that would correspondingly increase a confidence indicator for the provided solution recommending the roll back. Conversely, if that person (or team) has a track record of installing software updates correctly, then this would decrease the confidence indicator for the roll back solution.

Alternatively, it may be determined that the changes in question were not intentionally made. For example, perhaps a software update was automatically installed without system administrator approval, or perhaps a given update was properly installed but happened to cause an unpredicted problem elsewhere in the computing system. In this example the blended data set 34 may include one or more of: knowledge base articles, message board/forum postings, and help desk tickets for the company supporting the computing system 20, discussing the same software update and/or similar software updates.

In any event, by using data from disparate sources 32, the computing device 10 is able to form useful blended data sets 34 that blend the data from the disparate sources 32, and is able to correlate a current behavior of the computing system 20 with historical operational information from the blended data sets 34. The computing device 10 is therefore able to predict problems/troubleshoot existing problems, recommend one or more potential solutions, and assign a likelihood of success to each of the proposed solutions to allow the computing device 10 to make decisions better, faster, and with an understanding of why particular remedial measures are being recommended—which provides considerable improvements over prior art analytics systems.

Assume, for example, that the computing device 10 receives an indication that a network (i.e., that of analyzed computing system 20) is about to crash. If the computing device 10 checks the usual suspects (e.g., too much activity on the website, or recent, substantial changes to the code) and does not identify the likely culprit, it may determine a different solution than just "add more hardware" or "revert to a prior version of the code." The computing device 10 can look through system logs, hardware statistics, etc. from various data sources to figure out what the problem might be, what the solution(s) might be, and the likelihood that the proposed solution(s) will work. For example, history might show that every time a certain program is modified, there are a number of errors. In such a case the computing device 10 could recommend reverting to a prior version of that software, with a confidence indicator indicating a high likelihood of success.

Figure 3:
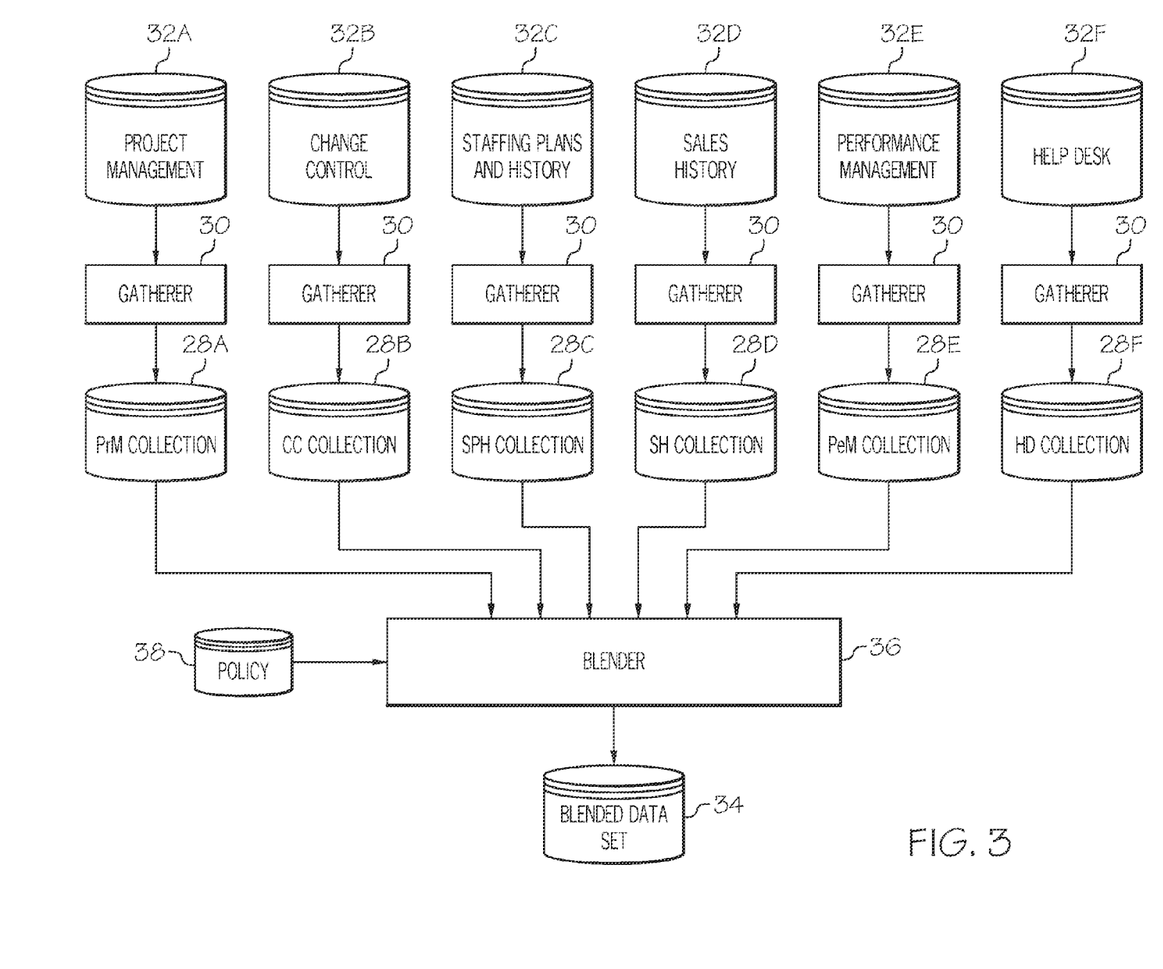
FIG. 3 schematically illustrates formation of a blended data set from a plurality of disparate data sources having different schemas.

FIG. 3 schematically illustrates formation of a blended data set 34 from a plurality of disparate data sources 32 having different schemas. While some of the databases 32 may share the same schema (e.g., if there are multiple sales history databases 32d from various locations), those of the data sources which are disparate will have different schemas, as they are storing different types of data, and most likely do not otherwise interact with each other. In the example of FIG. 3 a plurality of disparate data sources 32a-f are disclosed. For the discussion below it will be assumed that the data sources 32 store data for an organization, such as a company, and that the data sources 32 store information for various divisions within the company. Data source 32a stores project management data for the company (e.g., company initiatives that either require updates to the computing system 20 and/or can affect an expected utilization level of the computing system 20). Data source 32b stores change control information, including what changes to the computing system 20 have been requested/approved/scheduled/deployed (e.g., when changes to the computing system 20 are scheduled to occur). Some example change control data sources 32b could include a Configuration Management Database (CMDB), Asset Manager from COMPUTER ASSOCIATES, Unified Communications Manager from CISCO, etc.

Data source 32c stores staffing plans and history (e.g., what employees interact/have interacted with the computing system 20 and/or related computing systems to perform maintenance). Data source 32d stores sales history data (e.g., historical sales patterns). Data source 32e stores performance management data (e.g., how well do individuals in data source 32c perform their respective jobs, such as performing configuration/software updates to the computing system 20). Data source 32f stores help desk data relating to a history of complaints and reports of problems for the computing system 20. For example, the data source 32f may store one or more of the following:
 a quantity of service level breaches or near breaches that have involved the business service of computing system 20, or components of other systems that the service depends on;
 a quantity of service desk issues opened that reported problems after changes were made to components of the computing system 20 that are part of the business service using the computing system 20, or components of other systems that this service depends upon;
 preventative or corrective actions that have been historically used to successfully responds to similar situations;
 a historical root cause event of those breaches and the circumstances that led to that root cause event; and
 historical patterns of activity that have preceded the root cause event, that may be predictors of such a root cause event.

Gatherers 30 retrieve data from within these data sources, to form collections 28 which are transmitted to a blender 36 circuit (which is a part of controller 14). Based on a defined policy 38, the blender 36 creates one or more blended data sets 34. The policy 38 may include stored information about the determined relationships between the data sources 32, for example, to facilitate blending once those relationships have been determined. In the context of a company, disparate data sources 32 would likely exist in relative isolation from each other. For example, it is highly unlikely that sales history data would ever be combined with a change control schedule. In one or more embodiments, the disparate data sources 32 correspond to different disparate units within an organization (e.g., human resources, sales, marketing, information technology, etc.). Although only a single blender 36 is illustrated in FIG. 2, it is understood that a plurality of blenders 36 could be used, with each blender 36 combining information from selected data sources 32 to create the one or more blended data sets 34. Each blended data set 34 is a composite of the information from the data sources 32 that the blender 36 receives data from.

Figure 4:
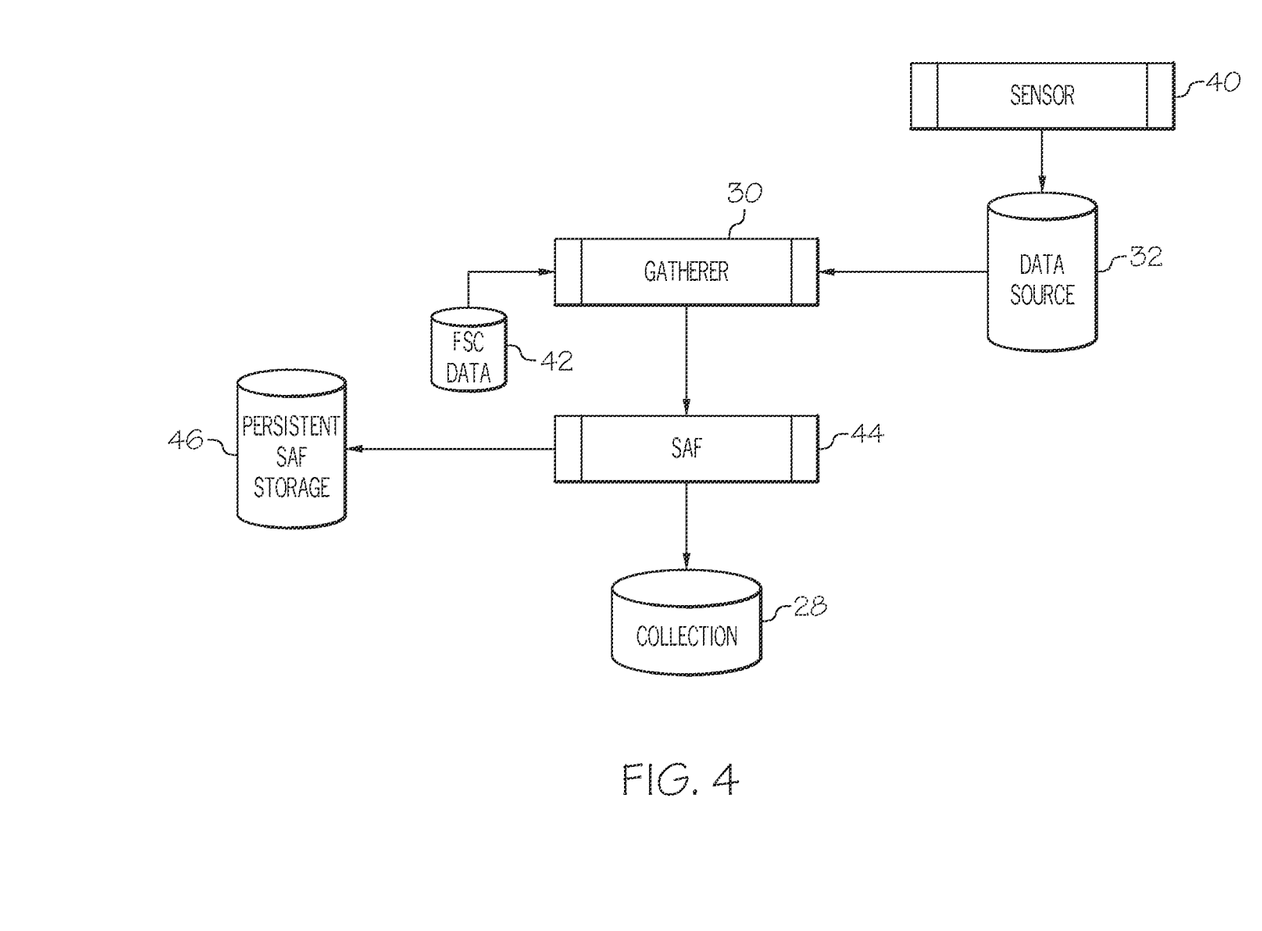
FIG. 4 schematically illustrates a gatherer configured to output a data collection.

FIG. 4 schematically illustrates a gatherer 30 configured to output a data collection 28. As shown in FIG. 4, the gatherer 30 obtains data from a data source 32. In one or more embodiments, the data source 32 may store output from a sensor 40 used to harvest information available from within an environment. Consider, for example, the case of users who employ a mobile device 22 to interact with a web borne financial services application (i.e., computing system 20 provides the application). When that mobile device 22 is employed by the end user to interact with the web borne financial service application, the information being sent between the mobile device 22 and the computing system 20 will traverse various network segments before arriving at its destination. The sensor 40 could be used to extract information about the network paths that this information traveled through, and that information can then be harvested and persisted for subsequent analysis.

To continue this example, assume that the following is true:
 Typical use patterns show that an end user is using a mobile device 22.
 Information indicates that this mobile device is located in the New York metropolitan area.
 The mobile device is accessing a web borne financial services application.
 The typical network path for this access involves:
  the mobile carrier's network (e.g., AT&T);
  who routes the request via the Internet to the financial services domain through a commercial network (e.g., COMCAST); and
  the commercial network traversing a network path through machines in New York, New Jersey, and Chicago, and eventually delivered to the financial services companies computers in Milwaukee where they are processed.

One or more of the sensors 40 would be extracting this type of information which can be used to establish the baseline "normal" behavior of network traffic related to the use of this mobile device, to access this web borne financial services application. This baseline information could be used to define, update, and/or augment a performance profile for the computing system 20.

Now, imagine that those sensors detect that the commercial network is traversing a network path that is not consistent with established behavior patterns, and is now taking a path originating in New York, traversing a network path through New York, New Jersey, Chechnya, then to Chicago, and on to the destination in Milwaukee. This path deviation that includes Chechnya might otherwise go completely un-noticed by the end user, and by the financial services application—after all, to them everything appears to be working still. Nevertheless, this does represent a deviation from established behavior patterns that may merit closer examination—and providing visibility into this deviation is a prerequisite to such examination.

In embodiments in which sensors 40 are used, the gatherers 30 are configured to be able to tap into the data being collected by a given sensor 40, and then harvest the requisite information and transport that information to an upstream "Store-and-Forward" (SAF) collection point (SAF 44) where it can then be combined with information from other sensors of the same, or different types. For example, the "project management" data source 32*a* of FIG. 3 may denote many project management data sources across a company, each having its own associated gatherer that contributes to a single project management collection 28*a*. The gatherer 30 uses filter and selection criteria data 42 to determine which data to send to SAF point 44, where the gathered data is stored in persistent SAF storage 46 before being included in collection 28.

There may be many different types of information gathered by one or more sensors 40. However, all of the information gathered by all sensors may not be relevant to a particular analytics requirement. For example, consider the preceding scenario of the financial services application. There would be a requirement to gather information about the mobile device involved in the transaction and the network paths through which the transaction information flowed, but supporting the particular analytics would not require detailed information about printer activity, for example. How though, is a gatherer 30 to determine what sensor information is relevant and necessary to support a given historical analysis requirement? The gatherer 30 determines this through filter and selection criteria 42 that identifies the sources of information (the sensors 40) that information needs to be gathered from, and criteria that further identifies the content from those sources that should be considered valuable to the task at hand and harvested—and information that does not meet that criteria is not harvested.

Figure 5A:
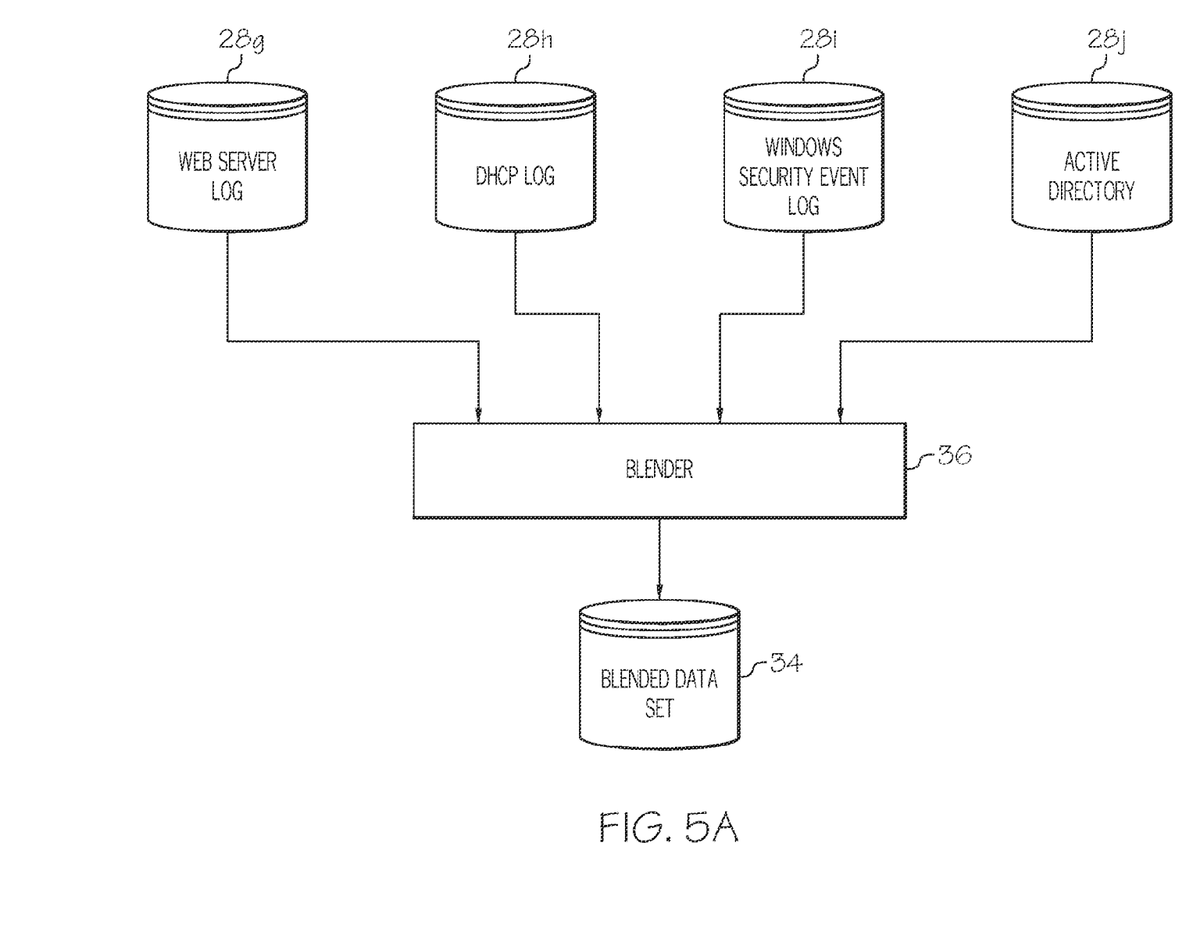
FIGS. 5a-b schematically illustrate formation of an example blended data set.
Figure 5B:
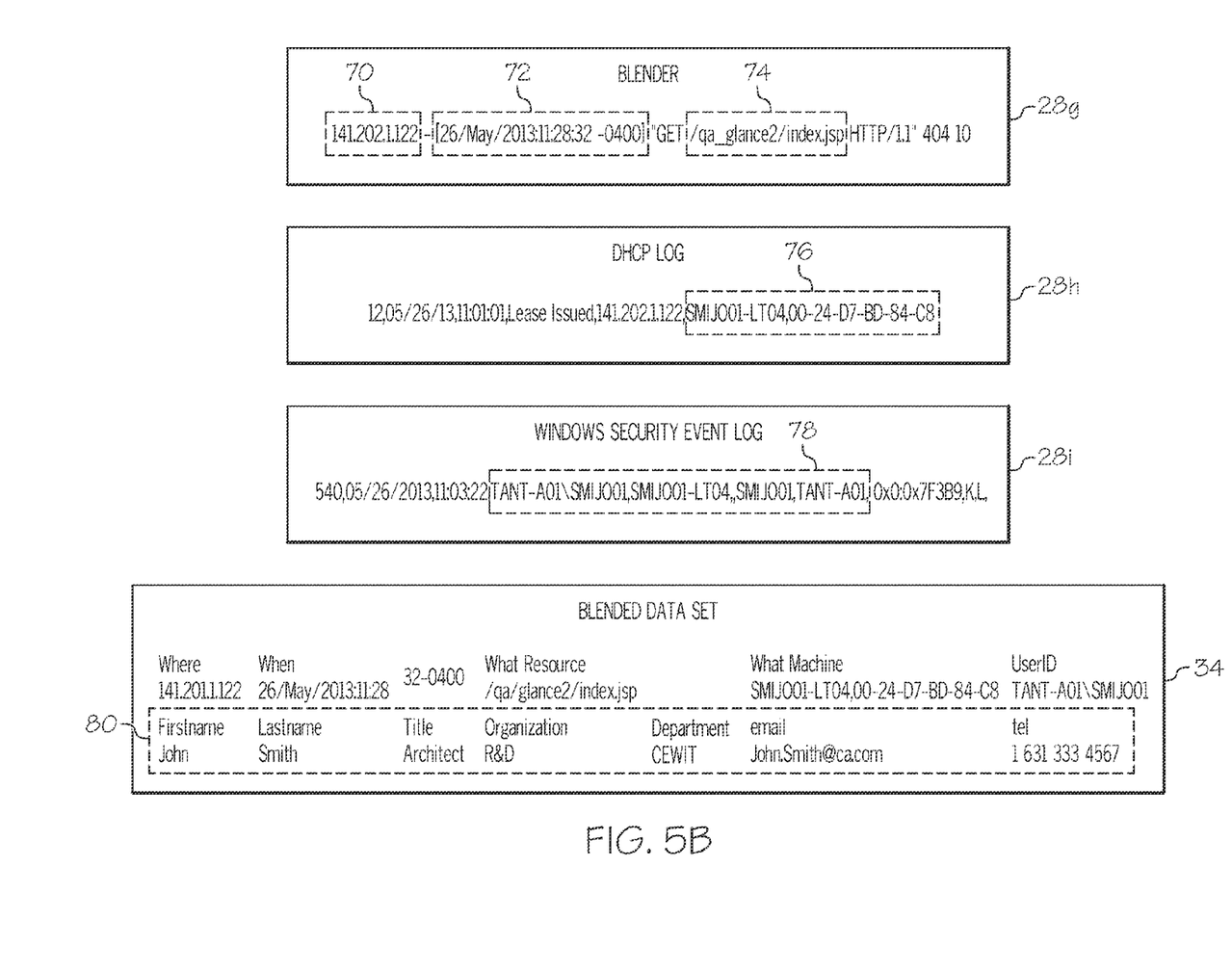

Referring again to FIG. 2, the gathering 102 described above comprises receiving data from a plurality of the gatherers 30, with each gatherer 30 being in communication with one or more of the data sources 32. The creating 106 of a blended data set from multiple data sources includes the data provided by the gatherers 30. An illustrative example of blended data set creation will now be discussed, with reference to FIGS. 5*a-b*, in the context of a website receiving requests for various content (i.e., the computing system 20 includes a web server hosting the website). In this example, and as shown in FIG. 5*a*, data from a web server log collection 28*g*, Dynamic Host Configuration Protocol (DHCP) collection 28*h*, WINDOWS Security Event Log collection 28*i*, and ACTIVE DIRECTORY collection 28*j* are blended into a blended data set 34. FIG. 5*b* provides excerpts from each of the collections 28*g-j* and the blended data set 34.

For this example, assume that website requests originate from a machine identified by an Internet Protocol (IP) Address, but without any indication or visibility into who is actually making the request. Thus, all that is known about the user from the request is an IP address. Recognizing that in today's modern world, IP addresses are highly dynamic, the same IP Address could be re-used by any number of machines, and any number of users. Although the IP address can only be used by a single machine at a specific point in time—over time, the IP address could be used by any number of different machines. In this context, the IP address is not sufficient information to be able to determine who is making a given access request to a given website.

Referring to FIG. 5*b*, the webserver log collection 28*g* includes the following entry:

141.202.1.122-[26/May/2013:11:28:32-0400] "GET/qa_glance2/index.jsp HTTP/1.1" 404 10

This entry reinforces that while a requesting IP address 70 is known ("141.202.1.122"), the time of access 72 is known ("26/May/2013:11:28:32"), and the resource being requested 74 is known ("/qa_glance2/index.jsp"), there is no indication of the user making the request. Thus, this web server log collection 28*g* alone is insufficient to determine the user.

However, that user identity can be realized by creating a blended data set 34 from the web server log collection 28*g*, and the other collections 28*h-j* from different machines. Using the IP address found in the web server log, one can identify the class C network ("141.202.1") that the request originated from. With the class C network identified, the computing device 10 consults a configuration management system to identify a DHCP server that assigns IP addresses for that class C network. With the DHCP server identified, the computing device 10 consults that DHCP server's log collection 28*h* to identify the name 76 of the machine that was associated with this IP address at the time when this web server access happened ("SMIJO01-LT04,00-24-D7-BD-84-C8").

With the name of the machine identified, the computing device 10 consults WINDOWS security event log collection 28*i* (e.g., on the DHCP server) to identify the user ID 78 of the person who was logged into that machine at the time of the web server access request ("TANT-A01\SMIJO01"). With the user ID of the person having been identified, the computing device 10 consults ACTIVE DIRECTORY collection 28*j* to get the user's contact information 80, including first name, last name, email address, and telephone number. By taking information from all these different sources, the computing device 10 creates a blended data set including the blended higher value log entry of FIG. 5*b* that includes pertinent user information beyond just an IP address.

That blended higher value log entry is now something much more suitable for direct use by analytics systems, and provides all the information needed (and more) to answer the question that would have been impossible to answer if the only single IP address-containing logfile data source was consulted.

Referring again to FIG. 2, the determining 108 that a current behavior of computing system 20 is indicative of an anomaly is performed based on performance data received from the computing system 20 (e.g., server logs in the ecommerce embodiment discussed above). As discussed above, in some embodiments the anomaly may be considered problematic, and so the corresponding response to the anomaly could be a solution to the problematic anomaly. However, in other embodiments the anomaly could be a good thing. For example, the computing device 10 may detect an anomalously positive behavior. Based on that anomaly, the computing device 10 could perform the method 100 to determine a response to the anomaly which included steps to take to modify computing systems that are similar to that of computing system 20 to also exhibit the anomalously positive behavior.

Referring again to FIG. 2, the correlating 112 of a current behavior to historical behaviors includes use of one or more of the following analytical techniques:
  Analytics: machine learning
  Crowdsourcing: implicit crowdsourcing
  Data mining: association rule learning
  Evolutionary algorithms: genetic algorithms
  Machine learning: artificial neural networks, Bayesian networks, clustering, decision tree learning, genetic programming, inductive logic programming, reinforcement learning, representation learning, sparse dictionary learning, sentiment analysis, supervised learning, support vector machines, unsupervised learning Natural language processing: question answering, automatic summarization, conference resolution, discourse analysis, machine translation, morphological segmentation, named entity recognition (NER), natural language generation, natural language understanding, neuro-linguistic programming (NLP), optical character recognition (OCR), parsing, part-of-speech tagging, relationship extraction, rule-based, sentence breaking, speech recognition, statistical machine learning, topic segmentation and recognition, word segmentation, word sense disambiguation Pattern recognition: categorical sequence labeling, classification algorithms, clustering algorithms, ensemble learning, parsing algorithms, real-valued sequence labeling, regression algorithms Regression analysis: linear regression, logistic regression, nonlinear regression, nonparametric regression, robust regression, stepwise regression Signal processing: audio signal processing, image processing, video processing Statistical analysis: A/B testing Supervised learning: classification Miscellaneous: data fusion, predictive modeling, semantic reasoning and inference.

Of course, these are only non-limiting examples of the types of analytical techniques that may be used to correlate data from the one or more blended data sets 34.

As discussed above, the historical behavior being analyzed includes that of the computing system 20 and/or another similar computing system. In one or more embodiments, computing system 20 is running a specific piece of software, and the "similar computing system" is another computing system that is running the same piece of software (and possibly even the same version of that software). In one or more embodiments the "similar computing system" is a predecessor of the computing system 20. For example, if the computing system 20 includes a webserver, the similar computing system may be a previous web server that was replaced by the computing system 20. Thus, the "similar computing system" is configured in a similar way as the computing system 20, such that analysis of historical behavior of the similar computing system would be meaningful for the computing system 20.

In one or more embodiments, determining 114 a response to the anomaly (e.g., a solution 24) to the problem based on the correlation comprises determining one of: a recommendation to rollback a detected change to a component of the computing system 20 that has been altered during an observation period during which the computing system 20 was configured to implement the transactions at issue; a recommendation to implement a new change to a component of the computing system 20; or a recommendation that no components of the computing system 20 need to be changed. In one or more embodiments, the recommendation that no components of the computing system 20 need to be changed is only determined if the occurrence of the performance data not conforming with the performance profile is determined to be permissible based on data in one or more of the data sources. The provided solution 24 may also include a number of steps required to perform the solution (e.g., what new software to install, which piece of hardware to replace, etc.).

In one or more embodiments, a confidence indicator representing an estimated likelihood that the solution 24 will solve the problem is determined based on the correlating 112, and the solution is presented along with its associated confidence indicator. For example, to avoid a crash in a computer system or network, the computing device 10 may send an event (e.g., to a user, an administrator, or an automated system) with a recommended action and a confidence level of N %. The event, or call to action, might be to add more hardware, or to revert to a prior version of the code that did not encounter the error. This information may be provided with an understanding that not implementing the solution may lead to a worse problem (e.g., a more serious failure of the analyzed computing system 20).

Referring again to FIG. 1, the computing device 10 includes an interface circuit 12, controller 14, and a computer readable storage medium (shown as memory 16). The interface circuit 12 is configured to communicate with the various gatherers 30 to receive the data collections 28, and to communicate with the computing system 20. The interface circuit 12 may include an Ethernet interface or other IP-based interface, for example. Controller 14 includes one or more processing circuits configured to implement the method 100. The processing circuits may include one or more processors, microcontrollers, hardware circuits, firmware, or a combination thereof. The memory 16 comprises computer readable media that stores the one or more blended data sets 34. The memory 16 may also comprise a computer program product 18 storing computer readable program code which configures the computing device 10 as described above.

The embodiments described above dramatically expand the scope of information available for analytics, by examining historical information from disparate systems (data sources 32) that have direct, indirect, and in some cases multiple degrees of separation from the computing system 20 exhibiting the condition that requires remedy. Through application of data mining and analytics techniques, information from these various disparate systems is processed and then the computation of the confirmable and probable intersections and relationships between information found in those systems is determined. Once determined, patterns of coincidence (i.e., the relationships determined in step 104 and correlation performed in step 112) provide insight into the probable confluence of root causes (often there is more than a single initiating root cause event). This enables an expedient response to an anomaly being witnessed, and better performance over traditional systems that analyze a much narrower subset of data. Moreover, the embodiments described above can also identify the causes of a problem and recommend remedies for those problems for tangential conditions that were caused or exacerbated by those root cause events.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    gathering data from multiple disparate data sources that have different schemas;
    determining relationships between the data gathered from the multiple data sources;
    creating a blended data set from the data gathered from the multiple data sources based on the determined relationships;
    determining a current behavior of a computing system, the current behavior being indicative of an anomaly, said determining a current behavior comprising determining that performance data for the computing system which relates to performance of a plurality of computer-implemented transactions does not conform with a performance profile for the computing system;
    determining, from the blended data set, historical behaviors of the same computing system or a similar computing system;
    correlating the current behavior to the historical behaviors to obtain a correlation; and
    determining, based on the correlation, a response to the anomaly and a confidence indicator indicating an estimated likelihood that the response to the anomaly will resolve the anomaly, wherein the response comprises one of:
        a recommendation to rollback a detected change to a component of the computing system that has been altered during an observation period during which the computing system was configured to implement the transactions;
        a recommendation to implement a new change to a component of the computing system; and
        a recommendation that no components of the computing system need to be changed; and
    presenting the response along with its determined confidence indicator to a user.

2. The computer-implemented method of claim 1, wherein gathering data from multiple data sources having different schemas comprises:
    receiving the data from a plurality of gatherers, each gatherer being in communication with one or more of the data sources.

3. The computer-implemented method of claim 1, wherein determining a current behavior of the computing system that is indicative of an anomaly further comprises:
    determining components included in the computing system; and
    determining if a configuration of any of the components of the computing system has changed over an observation period during which the computing system was configured to implement the transactions.

4. The computer-implemented method of claim 3, wherein if the configuration of any of the components is determined to have been changed over the observation period the method further comprises:
    determining if the changes were intentional; and
    determining who made the changes.

5. The computer-implemented method of claim 1, wherein the recommendation that no components of the computing system need to be changed is only determined as the response if the occurrence of the performance data not conforming with the performance profile is determined to be permissible based on the data in one or more of the data sources.

6. A computing device comprising:
    an interface circuit configured to receive data from a plurality of gatherers, each gatherer being in communication with one or more of a plurality of data sources, wherein the data sources are disparate and have different schemas; and
    a controller circuit configured to:
        gather the data received from the plurality of data sources;
        determine relationships between the data sources;
        create a blended data set from the multiple data sources based on the determined relationships;
        determine that a current behavior of a computing system is indicative of an anomaly by determining that performance data for the computing system which relates to performance of a plurality of computer-implemented transactions does not conform with a performance profile for the computing system;
        determine, from the blended data set, historical behaviors of the same computing system or a similar computing system;
        correlate the current behavior to the historical behaviors to obtain a correlation; and
        determine, based on the correlation, a response to the anomaly and a confidence indicator that represents an estimated likelihood that the response to the anomaly will resolve the anomaly, wherein the controller circuit is configured to determine the response as comprising one of:
            a recommendation to rollback a detected change to a component of the computing system that has been altered during an observation period during which the computing system was configured to implement the transactions;

a recommendation to implement a new change to a component of the computing system; and a recommendation that no components of the computing system need to be changed; and present the response along with its associated confidence indicator to a user.

7. The computing device of claim 6, wherein to determine a current behavior of the computing system that is indicative of an anomaly, the controller circuit is configured to:

determine components included in the computing system; and determine if a configuration of any of the components of the computing system has changed over an observation period during which the computing system was configured to implement the transactions.

8. The computing device of claim 7, wherein the controller circuit is configured to, if the configuration of any of the components is determined to have been changed over the observation period:

determine if the changes were intentional; and determine who made the changes.

9. The computing device of claim 6, wherein the recommendation that no components of the computing system need to be changed is only determined as the response if the occurrence of the performance data not conforming with the performance profile is determined to be permissible based on data in one or more of the data sources.

10. A computer program product comprising:

a computer readable storage medium having computer readable program code embodied therewith, the computer readable program code comprising:

computer readable program code configured to gather data from multiple disparate data sources that have different schemas;

computer readable program code configured to determine relationships between the data sources;

computer readable program code configured to create a blended data set from the multiple data sources based on the determined relationships;

computer readable program code configured to determine that a current behavior of a computing system is indicative of an anomaly by determining that performance data for the computing system relating to performance of a plurality of computer-implemented transactions does not conform with a performance profile for the computing system;

computer readable program code configured to determine, from the blended data set, historical behaviors of the same computing system or a similar computing system;

computer readable program code configured to correlate the current behavior to the historical behaviors to obtain a correlation; and computer readable program code configured to determine, based on the correlation, a response to the anomaly and a confidence indicator indicating an estimated likelihood that the response to the anomaly will resolve the anomaly, wherein the response comprises one of:

a recommendation to rollback a detected change to a component of the computing system that has been altered during an observation period during which the computing system was configured to implement the transactions;

a recommendation to implement a new change to a component of the computing system; and a recommendation that no components of the computing system need to be changed; and computer readable program code configured to present the response along with its associated confidence indicator to a user.

11. The computer program product of claim 10, wherein the computer readable program code configured to gather the data from the multiple data sources that have different schemas comprises:

computer readable program code configured to receive the data from a plurality of gatherers, each gatherer being in communication with one or more of the data sources.

12. The computer program product of claim 10, wherein the computer readable program code configured to determine a current behavior of the computing system that is indicative of an anomaly comprises:

computer readable program code configured to determine components included in the computing system; and computer readable program code configured to determine if a configuration of any of the components of the computing system has changed over an observation period during which the computing system was configured to implement the transactions.

13. The computer program product of claim 12, wherein the computer readable program code further comprises:

computer readable program code configured to determine if any changes made to the configuration of any of the components over the observation period were intentional; and computer readable program code configured to determine who made the changes.

14. The computer program product of claim 10, wherein the recommendation that no components of the computing system need to be changed is only determined as the response if the occurrence of the performance data not conforming with the performance profile is determined to be permissible based on data in one or more of the data sources.

* * * * *